Patented Mar. 18, 1952

2,589,258

UNITED STATES PATENT OFFICE 2,589,258

HYDRAZOBISALKANESULFONATE POLYMERIZATION CATALYST FOR ETHYLENICALLY UNSATURATED MONOMERS

Edward G. Howard, Jr., Wilmington, Del., assignor to E. I. du Pont de Nemours & Company, Wilmington, Del., a corporation of Delaware No Drawing. Application February 1, 1950, Serial No. 141,867

10 Claims. (Cl. 260—92.8)

This invention relates to a process for the addition polymerization of polymerizable organic compounds and more particularly to a new polymerization catalyst system.

Polymerization of polymerizable ethylenically unsaturated compounds has achieved widespread technical importance. The customary polymerization catalysts, or initiators, which initiate such polymerization contain directly linked oxygen atoms and include such compounds as benzoyl peroxide and potassium persulfate. Conventional polymerization systems require relatively high temperatures to initiate the polymerization and to give high rates of conversion of the monomeric unsaturate to the polymer. The employment of high temperatures in some polymerizations leads to polymers having inferior properties. In some instances where appreciable rates of polymerization have been achieved at lower temperatures, the products have superior physical properties which are of substantial economic importance, such as, for example, the increased abrasion resistance of synthetic rubbers prepared at low temperatures.

This invention has as an object the provision of a new polymerization process. A further object is the provision of polymerization initiator systems effective at temperatures lower than have hitherto been customarily used. Other objects will appear hereinafter.

These objects are accomplished by this invention wherein a polymerizable ethenoid monomer, i. e., an organic compound subject to addition polymerization and containing an ethylenic carbon carbon double bond is polymerized by bringing a dispersion, preferably aqueous, thereof in contact with cupric or ferric ion, a peroxide and a hydrazo disulfonate ion wherein the hydrazo group is separated from each sulfonate, —SO$_3$—, radical by a divalent hydrocarbon radical.

The following examples in which parts are by weight are illustrative of the invention.

Example I

A glass container was charged with 56 parts of absolute ethyl alcohol, 44 parts of water, and 0.55 part of sodium hydrazobismethanesulfonate. The vessel and contents were cooled to 0° C., 15.6 parts of vinyl chloride, 5.7 parts of a 3% solution of hydrogen peroxide and 0.02 part of cupric chloride dihydrate added. After standing one hour at 0° C. the polymer was removed and dried. There was obtained 8.9 parts of polyvinyl chloride, corresponding to a 57% conversion.

Example II

The general procedure of Example I was repeated except that in place of the hydrogen peroxide, 1.04 parts of cumene hydroperoxide was employed. There was obtained a 58% yield of polymer.

Repetition of this experiment with the exception that no hydrazo compound was present gave no polymerization. Similarly with hydrogen peroxide as the peroxide but with no hydrazo compound present and with or without cupric chloride substantially no polymerization occurred.

Example III

When the general procedure of Example I was repeated except that 0.01 part of cupric chloride dihydrate was used and the temperature was 25° C., an 80% yield of polyvinyl chloride was obtained in one hour.

When cupric chloride was omitted only a 37% yield of polymer was obtained in seven hours.

Example IV

A container was charged with 220 parts of water, 13.2 parts of acrylonitrile, 0.55 part of sodium hydrazobismethanesulfonate, 5.7 parts of a 3% solution of hydrogen peroxide, and 0.04 part of cupric chloride dihydrate. After one hour at 25° C. a 51% conversion of monomer to polymer had occurred.

Example V

A vessel having a capacity of 375 parts by weight of water was charged with 1.1 parts of sodium hydrazobismethanesulfonate, 0.055 part of cupric chloride dihydrate, 60 parts of deoxygenated water, 100 parts of 95% ethanol, 11 parts of allyl glycidyl ether, 25.5 parts of vinyl chloride, and 17 parts of 3% aqueous hydrogen peroxide under an atmosphere of oxygen-free nitrogen. As the reaction mixture was warmed to room temperature (28° C.), polymer formation started at about 0° C. and proceeded rapidly with the formation of a heavy precipitate in an hour at room temperature. During the total reaction period of eighteen hours no apparent change was noted after the first two hours. The washed, dried copolymer weighed 18.2 parts, corresponding to a 50% conversion. It analyzed for 48.9% chlorine, indicating a composition of 86.1% vinyl chloride and 13.9% allyl glycidyl ether, and was soluble in cyclohexonone to give a 10% solution having a viscosity of 0.14 poise at 25° C.

Considerably lower conversions were obtained when other known polymerization catalysts were employed for this monomer mixture, e. g., a 25% yield was obtained with benzoyl peroxide; 25% with azodiisobutyronitrile; and 30% with ammonium persulfate and bisulfite under similar conditions.

*Example VI*

The general procedure of Example IV was repeated except that 2.5 parts of a 0.025 molar aqueous solution of ferric chloride was employed in place of the cupric chloride. A 60% conversion of monomer to polymer occurred in one hour at 25° C. No polymer was obtained (a) when silver nitrate was employed, (b) when no heavy metal salt was employed.

The process of this invention is of generic application to the addition polymerization of polymerizable ethenoid monomers, i. e., polymerizable compounds having the non-aromatic ethylenic >C=C< group. Thus it is applicable to monomeric unsaturated polymerizable compounds in which the unsaturation is due to a terminal ethylenic group which is attached to a negative radical and i. e., particularly to vinylidene compounds, including vinyl compounds, which contain the $CH_2=C<$ group. This constitutes a particularly preferred type of monomer.

Compounds having a terminal methylene group which are subject to polymerization and copolymerization with the initiator systems of this invention include olefins, e. g., ethylene and isobutylene; acrylyl and alkacrylyl compounds, e. g., acrylonitrile, methyl methacrylate, ethyl acrylate, methacrylic acid, methacrylamide; vinyl and vinylidene halides, e. g., vinyl fluoride and vinylidene chloride; vinyl carboxylates, e. g., vinyl acetate and vinyl trimethylacetate; vinyl imides, e. g., N-vinylphthalimide; N-vinyl lactams, e. g., N-vinylcaprolactam; vinyl aryls such as styrene and other vinyl derivatives such as the vinylpyridines, methyl vinyl ketone and vinyl ethyl ether.

Polyfluoroethylenes including tetrafluoroethylene, chlorotrifluoroethylene and 1,1-dichloro-2,2-difluoroethylene may be polymerized and copolymerized by the process of this invention.

Polymerizable compounds that have a plurality of ethylenic double bonds which may be polymerized or copolymerized by the process of this invention include those having conjugated double bonds, such as butadiene and 2-chlorobutadiene, and compounds which contain two or more double bonds which are isolated with respect to each other, e. g., ethylene glycol dimethacrylate, methacrylic anhydride, diallyl maleate and divinyl benzene.

The process is applicable to the copolymerization (or "heteropolymerization") of one or more polymerizable compounds with compounds, e. g., maleic and fumaric esters, which are not per se readily polymerizable and to the copolymerization of one or more polymerizable monomers with carbon monoxide or sulfur dioxide. The process is also applicable to the polymerization of the polymerizable ethenoid monomers in the presence of chain transfer agents (Price, Mechanism of Reactions at Carbon-Carbon Double Bonds, Interscience, New York, 1946, pp. 82–83), e. g., carbon tetrachloride. This latter type of polymerization has been called "telomerization" and is further described in U. S. P. 2,440,800. The term "polymerization" is therefore inclusive not only of homopolymerization of one monomer but also of copolymerization, heteropolymerization, and telomerization.

This invention is applicable to the polymerization of any unsaturated compound subject to addition polymerization by prior techniques. Optimum conditions may vary from monomer to monomer. In general, liquid phase polymerization is desired and normally gaseous monomers, such as ethylene require pressure to give sufficiently high concentrations for rapid polymerization.

The polymerizations are usually carried out at −20° C. to 60° C. and the process of this invention is of particular advantage at these relatively moderate temperatures. Temperatures may be lower, however, the rate of polymerization may be low. Higher temperatures may be used in instances where the time of polymerization is to be kept at a minimum, e. g., in a continuous polymerization process. In general the time required for substantial polymerization depends on such variables as the specific temperature, concentrations, etc., and is generally from one to twenty-four hours although times of a few minutes in some polymerization systems may result in substantial polymerization.

Conventional means may be employed in the polymerization. A liquid medium, such as an emulsion or solution, in which the catalyst system, monomer and diluent are rather uniformly distributed, may be employed. Preferably aqueous systems are used.

The hydrazobissulfonic acids and salts useful in the process of this invention are those of the formula:

$$XSO_3—R—NHNH—R—SO_3X$$

wherein X is a cation, e. g., hydrogen or an alkali metal and R is a divalent hydrocarbon radical, and preferably an alkylene radical of 1 to 3 carbons. Preferably a sulfonic acid group and a hydrazine nitrogen are attached to the same carbon. Examples of such hydrazine compounds are hydrazobisisopropanesulfonic acid, and the corresponding sodium, potassium and ammonium salts and hydrazobisethanesulfonic acid and salts, i. e., compounds of the above formula wherein R is $CH_3CH<$ and $(CH_3)_2C<$.

The hydrazo compounds may be prepared from hydrazine, a bisulfite, and a carbonyl compound, i. e., an aldehyde or a ketone. The carbonyl compound, $R_1R_2C=O$, wherein $R_1$ and $R_2$ may be hydrogen or alkyls of generally not over 3 carbons and preferably of one carbon may be reacted first with hydrazine to form the azine, $$R_1R_2C=N—N=CR_1R_2$$

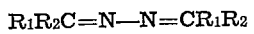

to which a bisulfite such as sodium bisulfite may be added to give the desired hydrazo sulfonic acid salt. Alternatively, a bisulfite may be reacted with the carbonyl compound to give a corresponding alpha-hydroxysulfonic acid salt which can be reacted with hydrazine to yield the desired hydrazo compound. This latter procedure is preferred in the preparation of hydrazobisalkanesulfonic acids from aldehydes and is described by Backer and Mulder, Rec. trav. chem., 53, 1120 (1934).

In the polymerization of polymerizable monomer, the hydrazosulfonate ion from the acid or its salts which are soluble in the polymerization system, and particularly the ammonium and alkali metal salts, is generally present in amounts of 0.01 to 5%, based on the weight of polymerizable monomer. The cupric or ferric ion, obtained from soluble cupric or ferric salts such as the sulfate or halides, is present generally in amounts of 0.001 to 20% based on the hydrazo compound.

The use of cupric ion is preferred because of advantages in color of the resultant polymers.

The presence of peroxidic oxidizing agents in amounts of from 0.1 to 100% of the weight of the hydrazosulfonic compound results in a rapid rate of polymerization at relatively low temperatures. Suitable peroxides are hydrogen peroxide, cumene hydroperoxide, tertiary-butyl peroxide, sodium peroxide, potassium and ammonium persulfates. Particularly preferred are the water-soluble peroxides.

The term "dispersion" herein includes solutions, i. e., homogeneous or molecular dispersions [Washburn—Principles of Physical Chemistry (McGraw-Hill, 1921) p. 145] as well as heterogeneous dispersions.

As illustrated in the examples, rapid polymerizations at relatively low temperatures result from the use of the process of this invention. The polymerization of vinyl chloride by the process of this invention constitutes a preferred embodiment of this invention.

The foregoing detailed description has been given for clearness of understanding only and no unnecessary limitations are to be understood therefrom. The invention is not limited to the exact details shown and described for obvious modifications will occur to those skilled in the art.

What is claimed is:

1. In the aqueous dispersion polymerization at temperatures within the range from −20° C. to 60° C. of an ethylenically unsaturated monomer subject to addition polymerization, the improvement wherein said monomer is polymerized by bringing a dispersion of said monomer in contact with (1) a polyvalent heavy metal ion of the class consisting of cupric and ferric ions, (2) a peroxide and (3) a hydrazodisulfonate ion $$-O_3SRNHNHRSO_3-$$

wherein R is a divalent hydrocarbon radical.

2. In an aqueous dispersion of polymerization at temperatures within the range from −20° C. to 60° C. of an ethylenically unsaturated monomer subject to addition polymerization, the improvement wherein said monomer is polymerized by bringing the same in contact in an aqueous system with an hydrazobisalkanesulfonate $$-SO_3RNHNHRSO_3-$$

ion wherein R is an alkylene radical, cupric ion, and a peroxidic oxidizing agent.

3. In an aqueous dispersion polymerization at temperatures within the range from −20° C. to 60° C. of vinyl chloride, the improvement wherein the vinyl chloride is polymerized by bringing the same in contact in an aqueous system with an hydrazobisalkanesulfonate, $-SO_3RNHNHRSO_3-$, ion wherein R is an alkylene radical, cupric ion, and a peroxidic oxidizing agent.

4. In an aqueous dispersion polymerization at temperatures within the range from −20° C. to 60° C. of an ethylenically unsaturated monomer subject to addition polymerization, the improvement wherein said monomer is polymerized by bringing the same in contact with an aqueous solution of a sodium hydrazobisalkanesulfonate, $NaO_3S-R-NHNH-R-SO_3Na$, wherein R is an alkylene radical, cupric ion, and a peroxidic oxidizing agent.

5. In an aqueous dispersion polymerization at temperatures within the range from −20° C. to 60° C. of vinyl chloride, the improvement wherein the vinyl chloride is polymerized by bringing the same in contact with an aqueous solution of a sodium hydrazobisalkanesulfonate $$NaO_3S-R-NHNH-R-SO_3Na$$

wherein R is an alkylene radical, cupric ion, and a peroxidic oxidizing agent.

6. In an aqueous dispersion polymerization at temperatures within the range from −20° C. to 60° C. of an ethylenically unsaturated monomer subject to addition polymerization, the improvement wherein said monomer is polymerized by bringing the same in contact in an aqueous system with an hydrazobisalkanesulfonate $$-SO_3RNHNHRSO_3-$$

ion wherein R is an alkylene radical of one to three carbons in each alkylene group, cupric ion, and a peroxidic oxidizing agent.

7. In an aqueous dispersion polymerization at temperatures within the range from −20° C. to 60° C. of vinyl chloride, the improvement wherein the vinyl chloride is polymerized by bringing the same in contact in an aqueous system with an hydrazobisalkanesulfonate, $-SO_3RNHNHRSO_3-$, ion wherein R is an alkylene radical of one to three carbons in each alkylene group, cupric ion, and a peroxidic oxidizing agent.

8. In an aqueous dispersion polymerization at temperatures within the range from −20° C. to 60° C. of an ethylenically unsaturated monomer subject to addition polymerization, the improvement wherein said monomer is polymerized by bringing the same in contact in an aqueous system with an hydrazobismethanesulfonate $$-SO_3CH_2NHNHCH_2SO_3-$$

ion, cupric ion, and a peroxidic oxidizing agent.

9. In an aqueous dispersion polymerization at temperatures within the range from −20° C. to 60° C. of vinyl chloride, the improvement wherein the vinyl chloride is polymerized by bringing the same in contact in an aqueous system with an hydrazobismethanesulfonate $$-SO_3CH_2NHNHCH_2SO_3-$$

ion, cupric ion, and a peroxidic oxidizing agent.

10. In the aqueous dispersion polymerization, at a temperature within the range from 0° C. to room temperature, of an ethylenically unsaturated monomer subject to addition polymerization, the improvement wherein said monomer is polymerized by bringing a dispersion of said monomer in contact with (1) a polyvalent heavy metal ion of the class consisting of cupric and ferric ions, (2) a peroxide and (3) a hydrazodisulfonate ion, $-O_3SRNHNHRSO_3-$, wherein R is a divalent hydrocarbon radical.

EDWARD G. HOWARD, Jr.

REFERENCES CITED

The following references are of record in the file of this patent:

UNITED STATES PATENTS

| Number | Name | Date |
|---|---|---|
| 2,344,785 | Owens | Mar. 21, 1944 |
| 2,376,014 | Semon | May 15, 1945 |
| 2,377,752 | Britton | June 5, 1945 |
| 2,405,950 | Hanford | Aug. 20, 1946 |
| 2,460,606 | Stewart | Feb. 1, 1949 |
| 2,468,111 | Robertson | Apr. 26, 1949 |